US012252384B2

(12) United States Patent
Stoops

(10) Patent No.: US 12,252,384 B2
(45) Date of Patent: Mar. 18, 2025

(54) PAINT CAN CAP REMOVAL SYSTEM AND METHOD THEREOF

(71) Applicant: Kevin Ray Stoops, Bucyrus, KS (US)

(72) Inventor: Kevin Ray Stoops, Bucyrus, KS (US)

( * ) Notice: Subject to any disclaimer, the term of this patent is extended or adjusted under 35 U.S.C. 154(b) by 461 days.

(21) Appl. No.: 17/409,338

(22) Filed: Aug. 23, 2021

(65) Prior Publication Data

US 2022/0041422 A1 Feb. 10, 2022

Related U.S. Application Data

(60) Continuation-in-part of application No. 29/767,902, filed on Jan. 26, 2021, now Pat. No. Des. 928,575, which is a division of application No. 29/676,588, filed on Jan. 11, 2019, now Pat. No. Des. 909,162.

(51) Int. Cl.
*B67B 7/18* (2006.01)

(52) U.S. Cl.
CPC .................................... *B67B 7/18* (2013.01)

(58) Field of Classification Search
CPC ..... B67B 7/18; B67B 7/44; B67B 7/14; B23P 17/00
USPC .......................................................... 53/492
See application file for complete search history.

(56) References Cited

U.S. PATENT DOCUMENTS

| | | | |
|---|---|---|---|
| 203,496 | A | 5/1878 | Phillipi |
| 556,554 | A | 3/1896 | Piper |
| D30,411 | S | 3/1899 | Kahn |
| 661,253 | A | 11/1900 | Zimmerman |
| D33,634 | S | 12/1900 | Lord, Jr. |
| D34,790 | S | 7/1901 | Richards |
| D46,269 | S | 8/1914 | Stewart |
| 1,138,456 | A | 5/1915 | Curran |
| D48,539 | S | 2/1916 | Woicula |
| 1,257,609 | A | 2/1918 | Johnson |

(Continued)

FOREIGN PATENT DOCUMENTS

| | | | |
|---|---|---|---|
| CN | 305732024 | S | 4/2020 |
| CN | 305771897 | S | 5/2020 |

(Continued)

OTHER PUBLICATIONS

"Corrected Notice of Allowance Received for U.S. Appl. No. 29/676,588 mailed on Oct. 6, 2020".

(Continued)

*Primary Examiner* — Robert F Long
*Assistant Examiner* — Xavier A Madison
(74) *Attorney, Agent, or Firm* — Kutak Rock LLP

(57) ABSTRACT

A paint can cap remover system and method is provided. The system includes a cap remover and a leverage element. The cap remover and leverage element are either a single unitary item or two separate items. The cap remover includes a main body portion with thumb tabs and a receiving edge. The receiving edge is configured to engage with the cap of a paint can, while the thumb tabs are configured to engage with a paint can cap and translate leveraging forces into rotational movement to assist in dislodging and removing the paint cap. The leverage element includes a handle portion and a connecting portion. The handle portion provides a surface or handle for a user to apply leveraging forces to the leverage element. The connecting portion interfaces with the cap remover to transfer forces applied to the leverage element.

6 Claims, 16 Drawing Sheets

(56) References Cited

U.S. PATENT DOCUMENTS

| | | | | | |
|---|---|---|---|---|---|
| 1,472,349 | A | | 10/1923 | Winchler | |
| 1,692,213 | A | | 11/1928 | Kielberg | |
| D80,663 | S | | 3/1930 | Moore et al. | |
| 2,546,037 | A | | 3/1951 | Mcguinness | |
| 2,571,401 | A | | 10/1951 | Williams | |
| D167,899 | S | | 10/1952 | Joannides | |
| D200,252 | S | | 2/1965 | Brown | |
| 3,311,264 | A | | 3/1967 | Cayer | |
| 3,583,263 | A | | 6/1971 | Herigstad | |
| D222,231 | S | | 10/1971 | Holtzman | |
| D259,704 | S | | 6/1981 | Castronovo | |
| 4,414,865 | A | * | 11/1983 | Brooks | B67B 7/18 D8/40 |
| 4,416,171 | A | | 11/1983 | Chmela | |
| D277,458 | S | | 2/1985 | Neggers | |
| 4,528,933 | A | | 7/1985 | Allen | |
| 4,666,051 | A | | 5/1987 | Trick | |
| D295,024 | S | | 4/1988 | Trick | |
| 4,731,512 | A | | 5/1988 | Barriac | |
| D316,950 | S | | 5/1991 | Kaiser | |
| D325,688 | S | | 4/1992 | Schreib | |
| 5,429,257 | A | | 7/1995 | Greenfeild et al. | |
| D365,738 | S | | 1/1996 | Lee | |
| D374,623 | S | | 10/1996 | Rafferty | |
| D380,387 | S | | 7/1997 | Weiler | |
| D403,562 | S | | 1/1999 | Molaro | |
| D411,451 | S | | 6/1999 | Young | |
| D422,503 | S | | 4/2000 | Lehn | |
| D447,681 | S | | 9/2001 | Kelleghan | |
| D475,603 | S | | 6/2003 | Kelleghan | |
| D479,800 | S | | 9/2003 | McRae | |
| D549,569 | S | | 8/2007 | Palmer, III | |
| D565,391 | S | | 4/2008 | Shetler | |
| D578,256 | S | | 10/2008 | Miller | |
| D605,011 | S | | 12/2009 | Jalet | |
| D628,874 | S | | 12/2010 | Buerchner et al. | |
| D682,690 | S | | 5/2013 | Bowes | |
| D734,536 | S | | 7/2015 | Sheynin et al. | |
| D742,241 | S | | 11/2015 | Shell-Schnitzer | |
| D789,247 | S | | 6/2017 | Burton et al. | |
| D828,751 | S | | 9/2018 | Ploeger | |
| D876,232 | S | | 2/2020 | Sibley | |
| D887,234 | S | | 6/2020 | Katsuma | |
| 10,815,109 | B2 | | 10/2020 | Piramoon | |
| D909,162 | S | | 2/2021 | Stoops | |
| D928,575 | S | | 8/2021 | Stoops | |
| 2003/0097909 | A1 | * | 5/2003 | Pote | B67B 7/42 81/3.4 |
| 2011/0185858 | A1 | * | 8/2011 | Luo | B67B 7/44 81/3.09 |
| 2013/0327184 | A1 | * | 12/2013 | Nelson | B67B 7/16 29/592 |

FOREIGN PATENT DOCUMENTS

| | | | |
|---|---|---|---|
| KR | 30-1102897 | S | 3/2021 |
| TW | D151593 | S1 | 2/2013 |
| TW | D157541 | S | 12/2013 |
| TW | D208137 | S | 11/2020 |

OTHER PUBLICATIONS

"Final Office Action Received for U.S. Appl. No. 29/676,588, mailed on Jul. 7, 2020".
"First Notification on Correction of Deficiencies Received for China Application No. 201930368182.1 mailed on Dec. 13, 2019, 2 pages".
"First Notification on Correction of Deficiencies Received for China Application No. 201930368183.6 Mailed on Dec. 12, 2019".
"Non Final Office Received for U.S. Appl. No. 29/676,588 mailed on Mar. 25, 2020".
"Notice of Allowance received for U.S. Appl. No. 29/767,902, Mailed on Apr. 28, 2021."
"Notice of Allowance Received for U.S. Appl. No. 29/676,588, mailed on Oct. 2, 2020".
"Notice of Amendment Dismissal received for Design Application No. 30-2019-0033223, mailed on Jul. 1, 2020."
"Notice of Decision to Grant Received for Chinese application No. 201930368182.1 mailed on Apr. 2, 2020, 5 pages".
"Notice of Decision to Grant Received for Chinese application No. 201930368183.6 mailed on Mar. 20, 2020".
"Notice of Decision to Grant Received for Korea Design application No. 30-2019-0033223 mailed on Jan. 4, 2021."
"Notice of Decision to Grant Received for Taiwan application No. 108304191 mailed on Sep. 10, 2020."
"Notice of Grounds for Rejection Received for Republic of Korea Application No. 30-2019-0033223 mailed on Dec. 26, 2019, 2 pages."
"Office Action received for Taiwan Application No. 108304191, dated Feb. 26, 2020, 3 pages".
"Office Action received for Taiwan Application No. 108304191, dated May 29, 2020."
"Second Notice of Grounds for Rejection Received for Republic of Korea Application No. 30-2019-0033223 mailed on Sep. 2, 2020."

* cited by examiner

PAINT CAN CAP REMOVAL SYSTEM AND METHOD THEREOF

CROSS-REFERENCE TO RELATED APPLICATIONS

This application is a continuation-in-part application of U.S. Design Patent Application Ser. No. 29/767,902, filed Jan. 26, 2021, now U.S. Pat. No. D928575, which claims priority to U.S. Design Patent Application Ser. No. 29/676,588, filed Jan. 11, 2019, now U.S. Pat. No. D909162, the entire disclosures of which are incorporated herein by reference.

FIELD OF THE INVENTION

The present invention relates generally to paint cap removers. More specifically, the present invention is concerned with a paint cap remover and leverage element to assist in the removal of paint can caps from paint cans.

BACKGROUND

Standard paint pails, buckets, and/or cans come in sizes of 5 gallons or larger and are intended to hold volumes of paint which are to be used multiple times. In between uses, the can protects the paint from curing or otherwise drying. Many of these cans include a removable cap which allows for a user to pour the paint from the can into a secondary receptacle, such as a paint tray, prior to application. Oftentimes during this pouring, paint and paint residue spill onto the threads of the cap. The cap is subsequently replaced on the can and secured, resulting in the paint on the threads drying and creating a bond which secures the cap to the can. Due to this, the cap can oftentimes be difficult to remove once the paint has dried. Accordingly, it would be advantageous to provide a system and method for removing paint caps.

SUMMARY

The present invention comprises a paint can cap remover system. The system includes a cap remover and a leverage element. The cap remover includes a main body portion with thumb tabs extending from a top surface of the main body portion and a receiving edge extending from a bottom surface of the main body portion. The receiving edge is configured to engage with the cap of a paint can, while the thumb tabs are configured to translate leveraging forces into rotational movement to assist in dislodging and removing the paint cap. The main body further includes one or more holes, the holes being configured to receiving tabs or securing elements of a leverage element. The leverage element includes a handle portion and a connecting portion. The handle portion provides a surface or handle for a user to apply leveraging forces to the leverage element. The connecting portion includes one or more tab which interfaces with the holes of the cap remover, thereby pairing or connecting the cap remover and the leverage handle. In some embodiments, the cap remover and leverage handle are unitary, such that they are formed from a single piece of material and are not readily separable. A method of removing a paint can cap is provided, the method including utilization of the aforementioned paint can cap remover system.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

Figure 1:
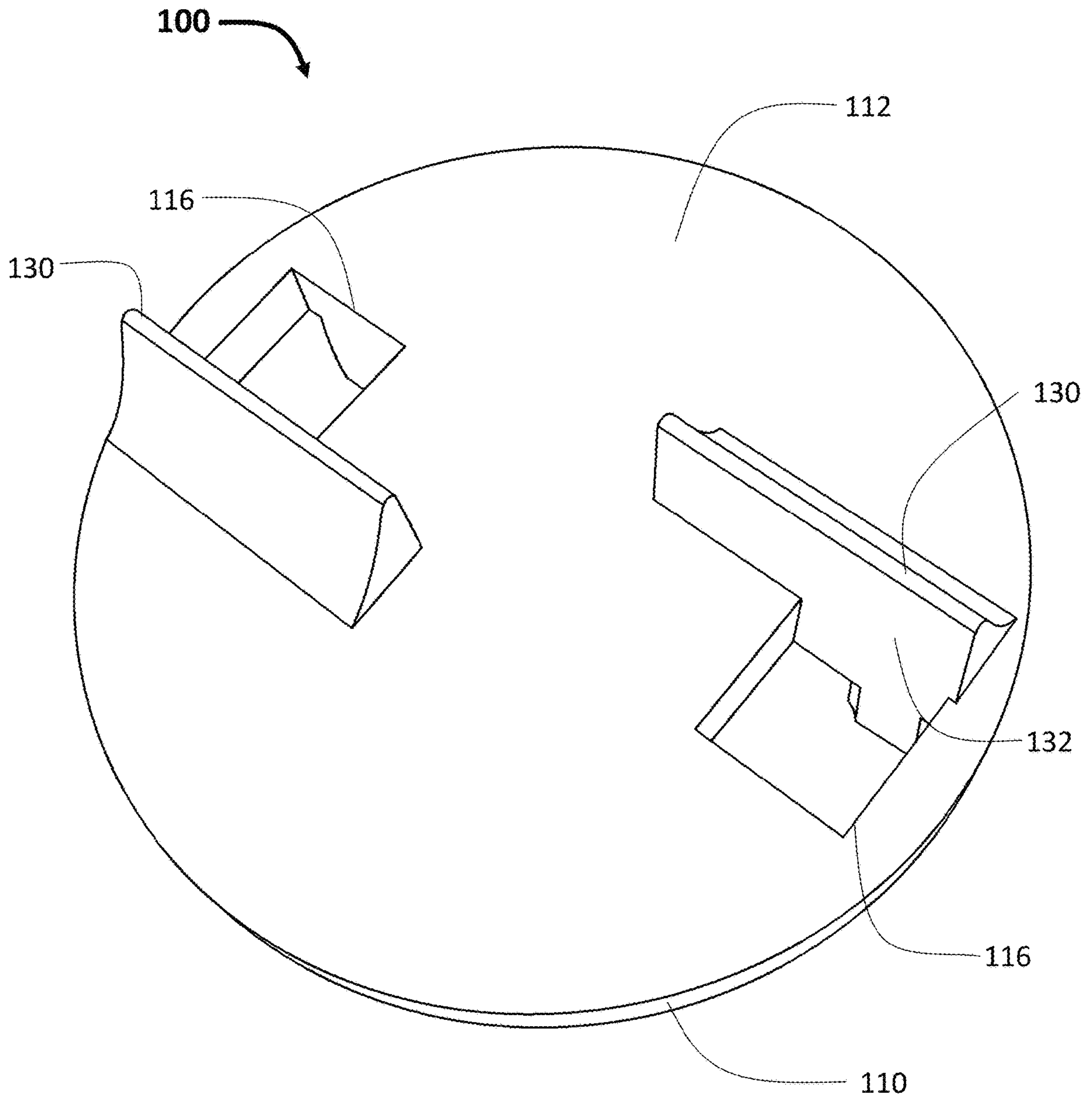
FIG. 1 is a top perspective view of a cap remover according to some embodiments of the present invention.
Figure 2:
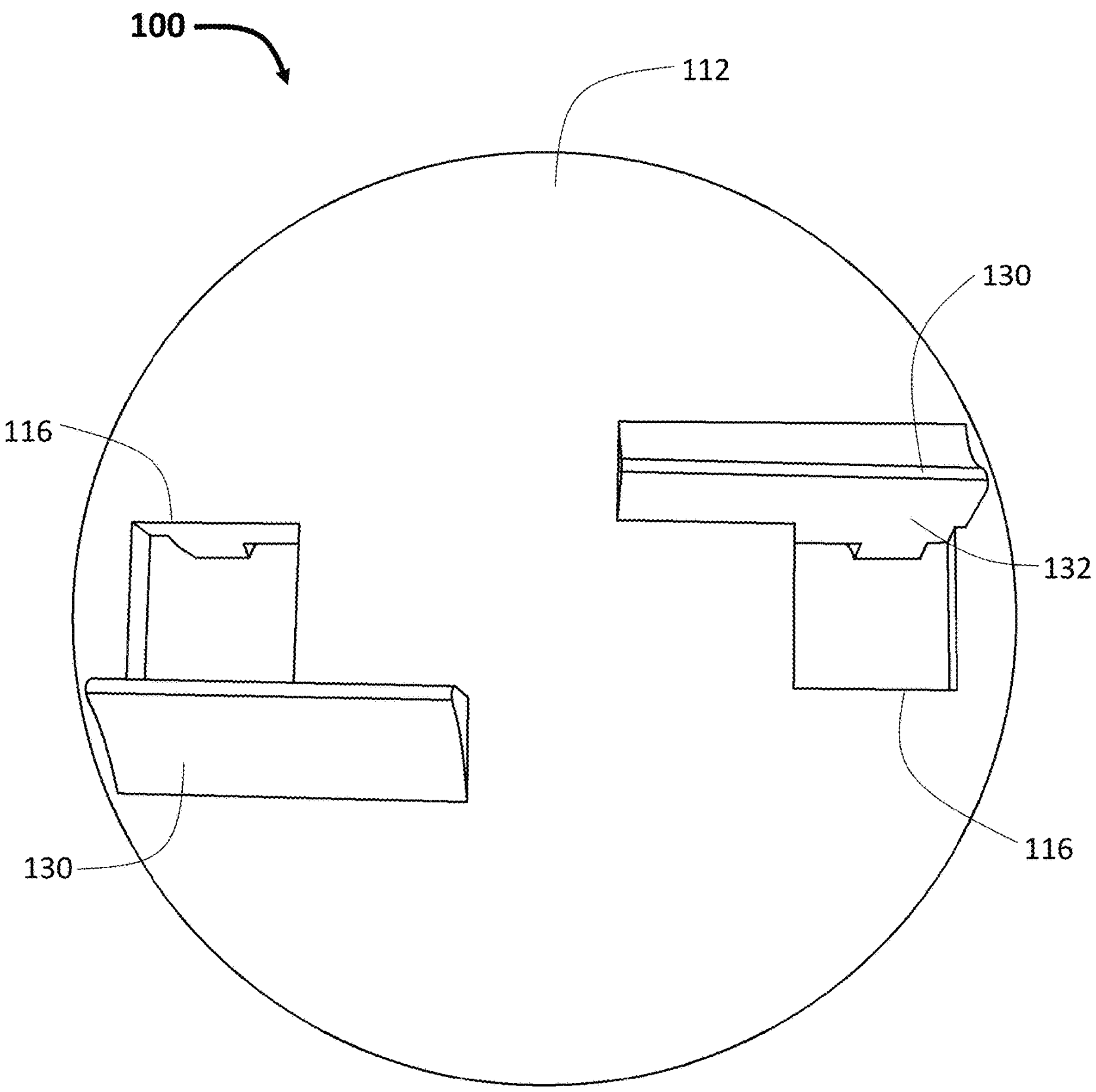
FIG. 2 is a top plan view of the cap remover of FIG. 1.
Figure 3:
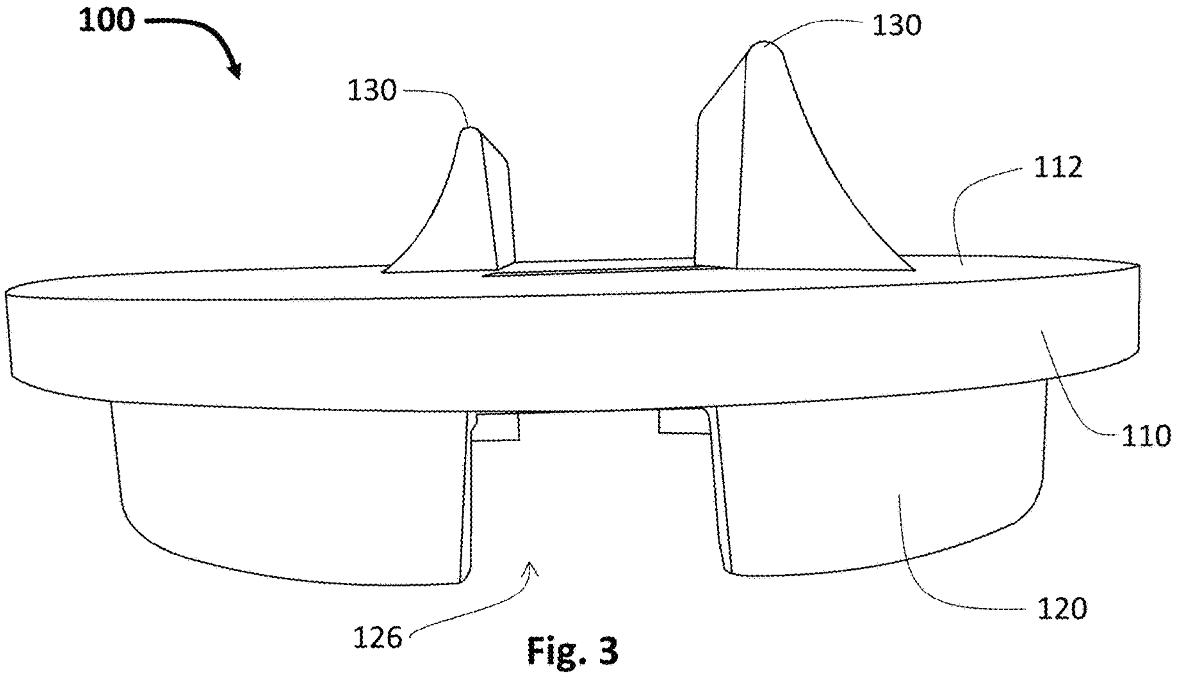
FIG. 3 is a right side elevation view of the cap remover of FIG. 1.
Figure 4:
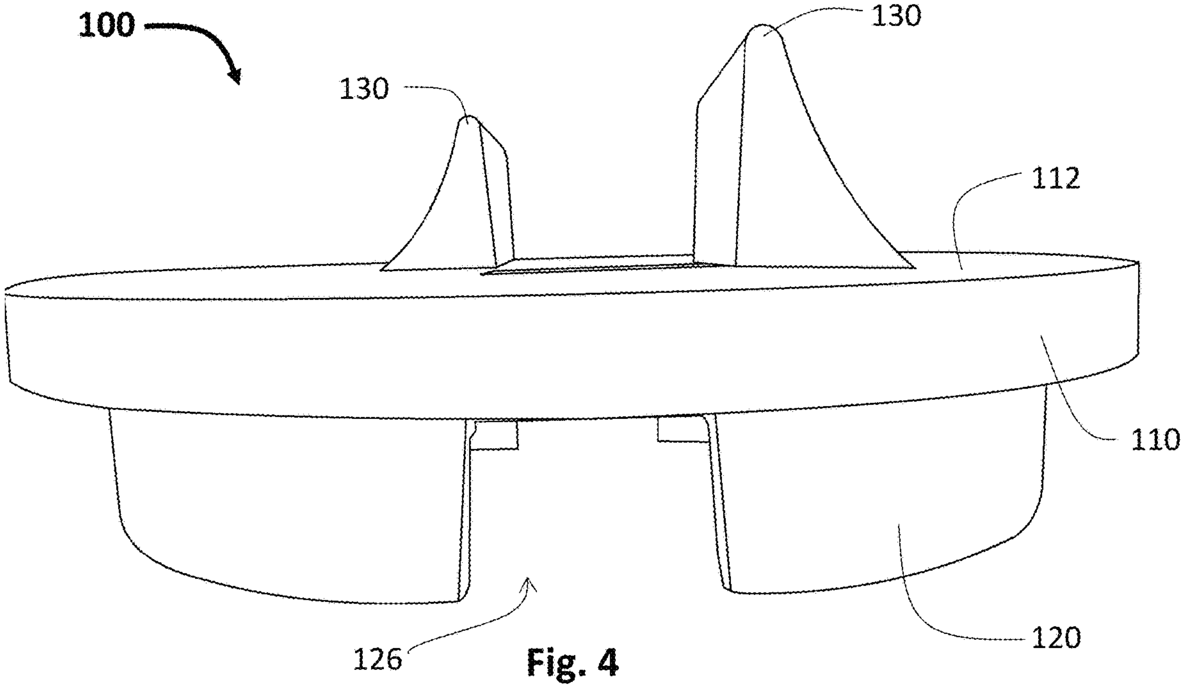
FIG. 4 is a left side elevation view of the cap remover of FIG. 1.
Figure 5:
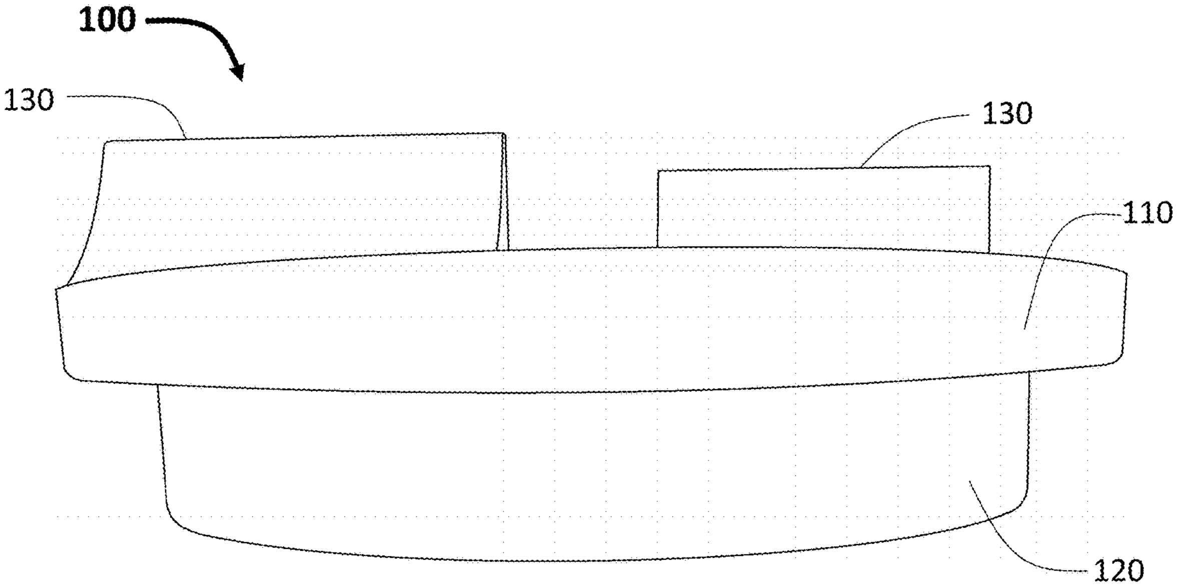
FIG. 5 is a front elevation view of the cap remover of FIG. 1.
Figure 6:
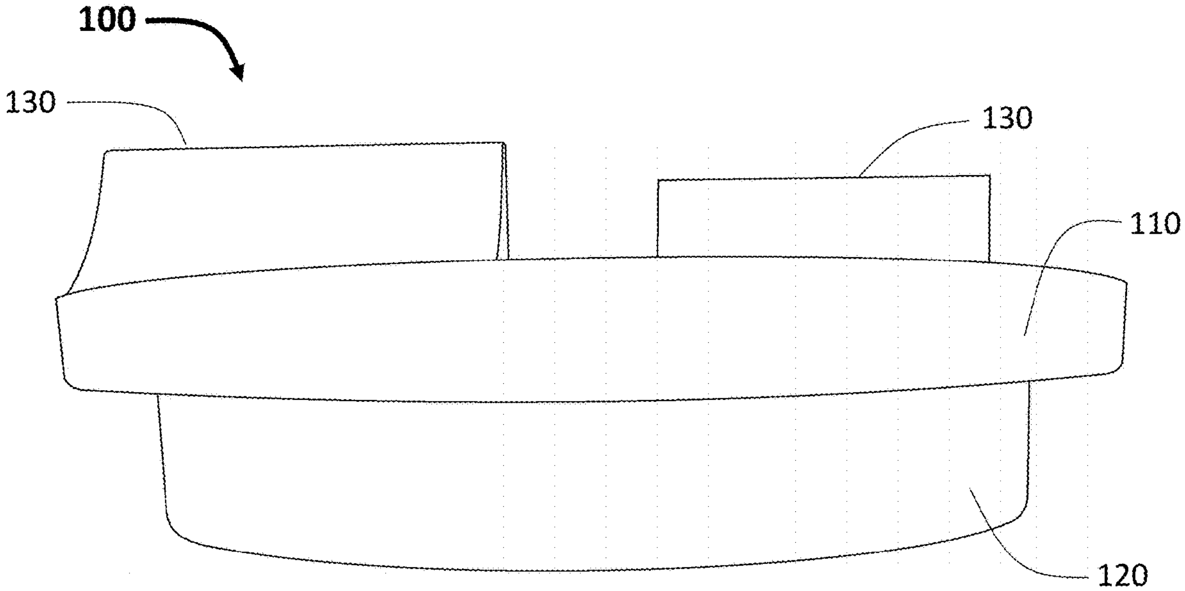
FIG. 6 is a rear elevation view of the cap remover of FIG. 1.
Figure 7:
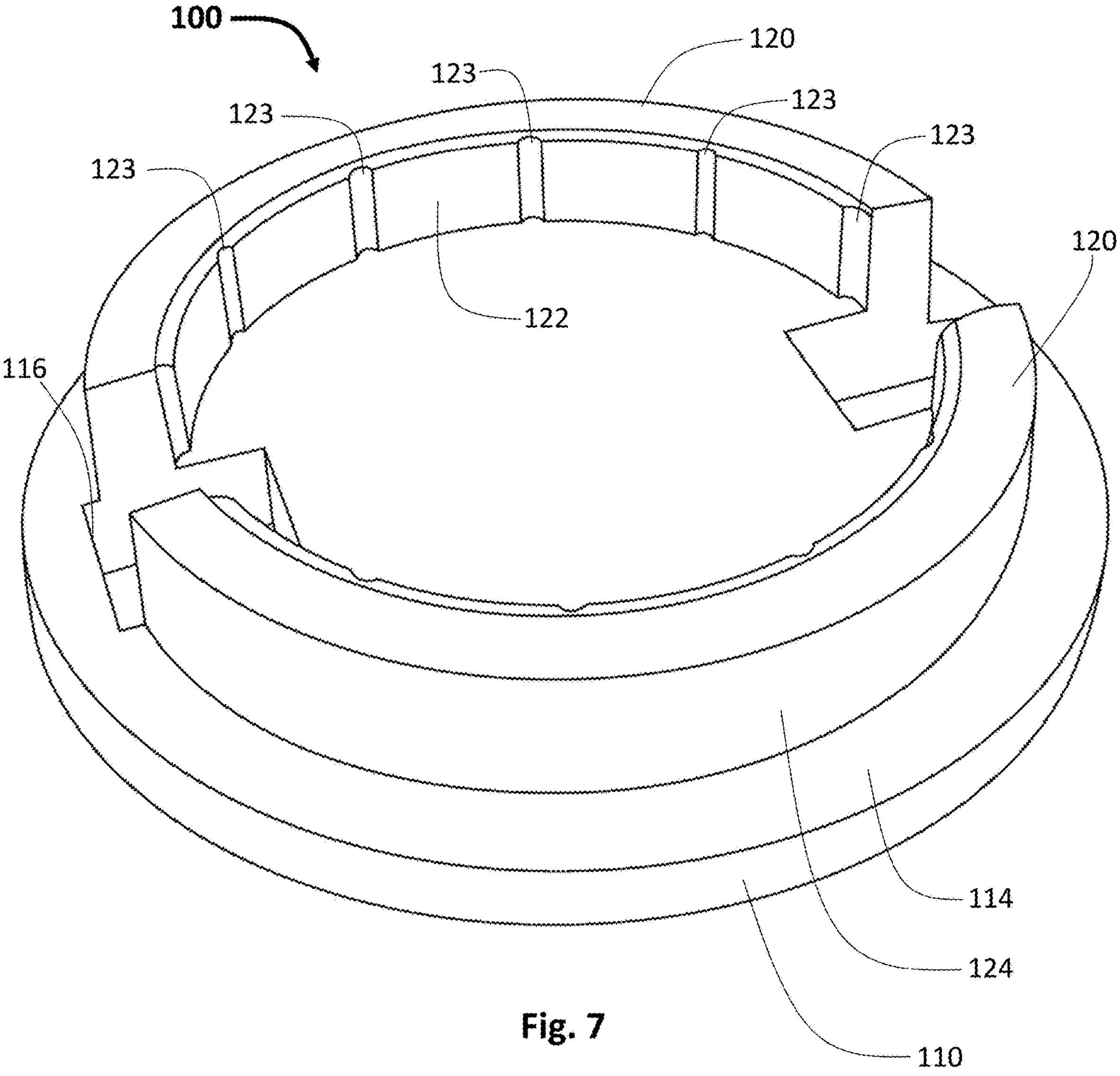
FIG. 7 is a bottom perspective view of the cap remover of FIG. 1
Figure 8:
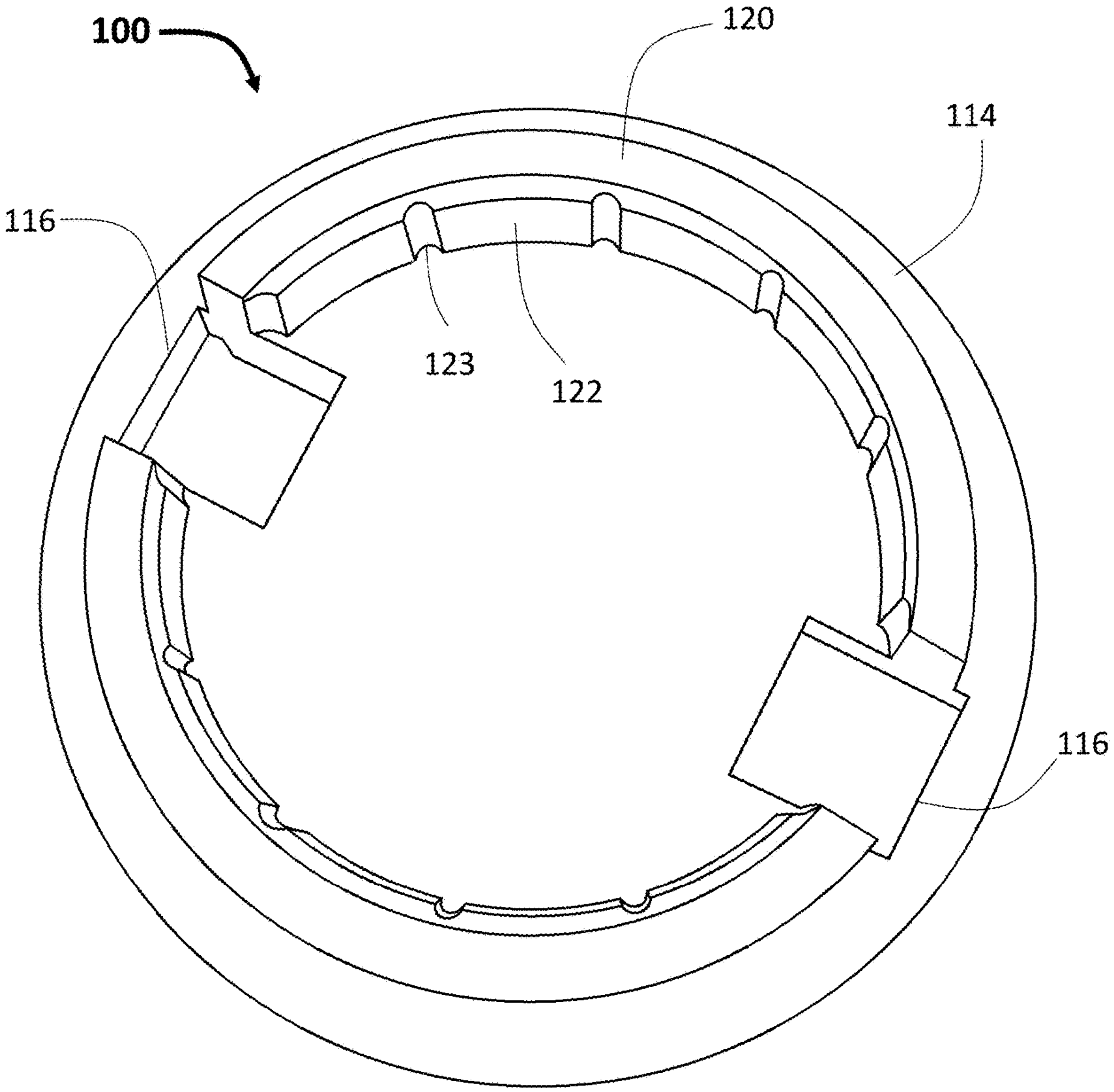
FIG. 8 is a bottom plan view of the cap remover of FIG. 1.
Figure 9:
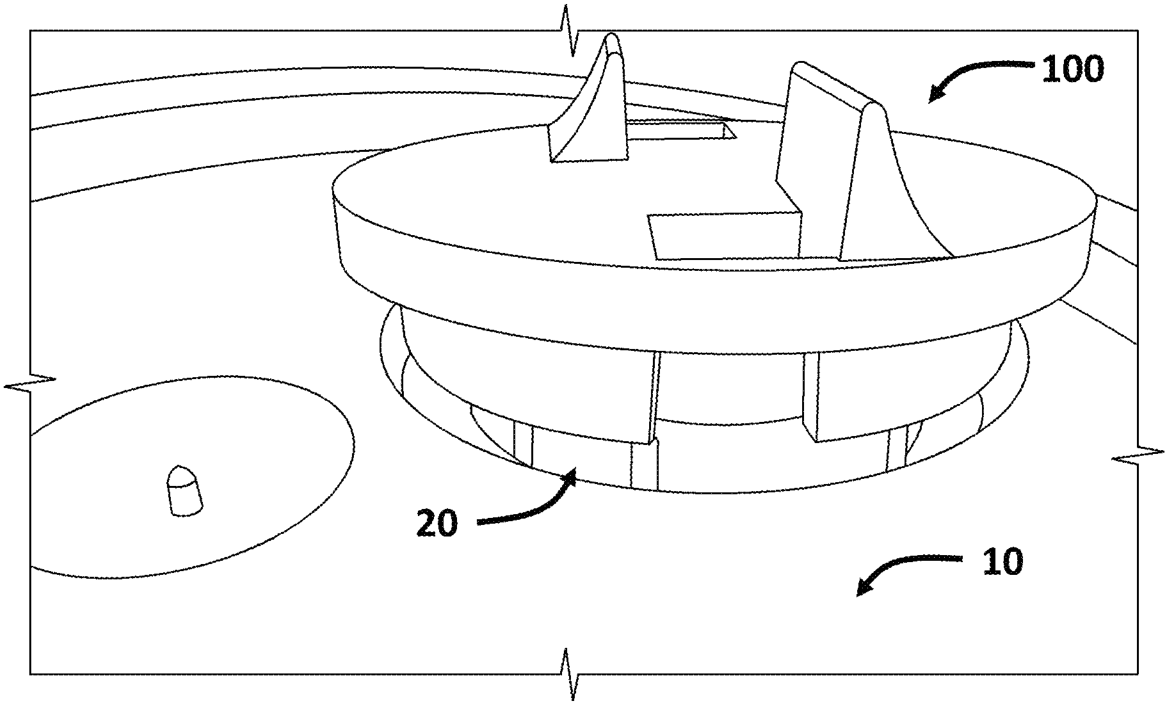
FIG. 9 is a perspective view of the cap remover of FIG. 1, shown partially engaged with a paint cap located at the top of a 5 gallon paint can.
Figure 10:
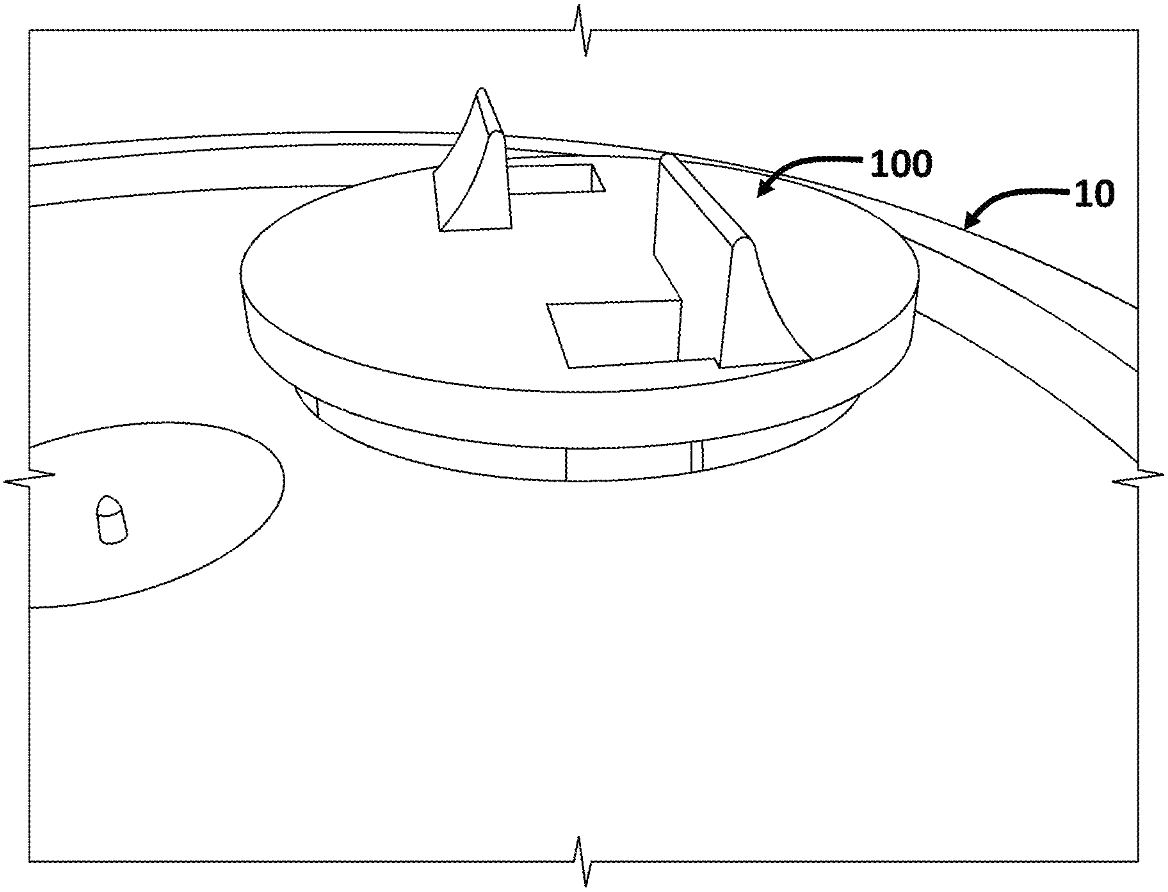
FIG. 10 is a perspective view of the cap remover of FIG. 1, shown fully engaged with a paint cap at the top of a 5 gallon paint can.
Figure 11:
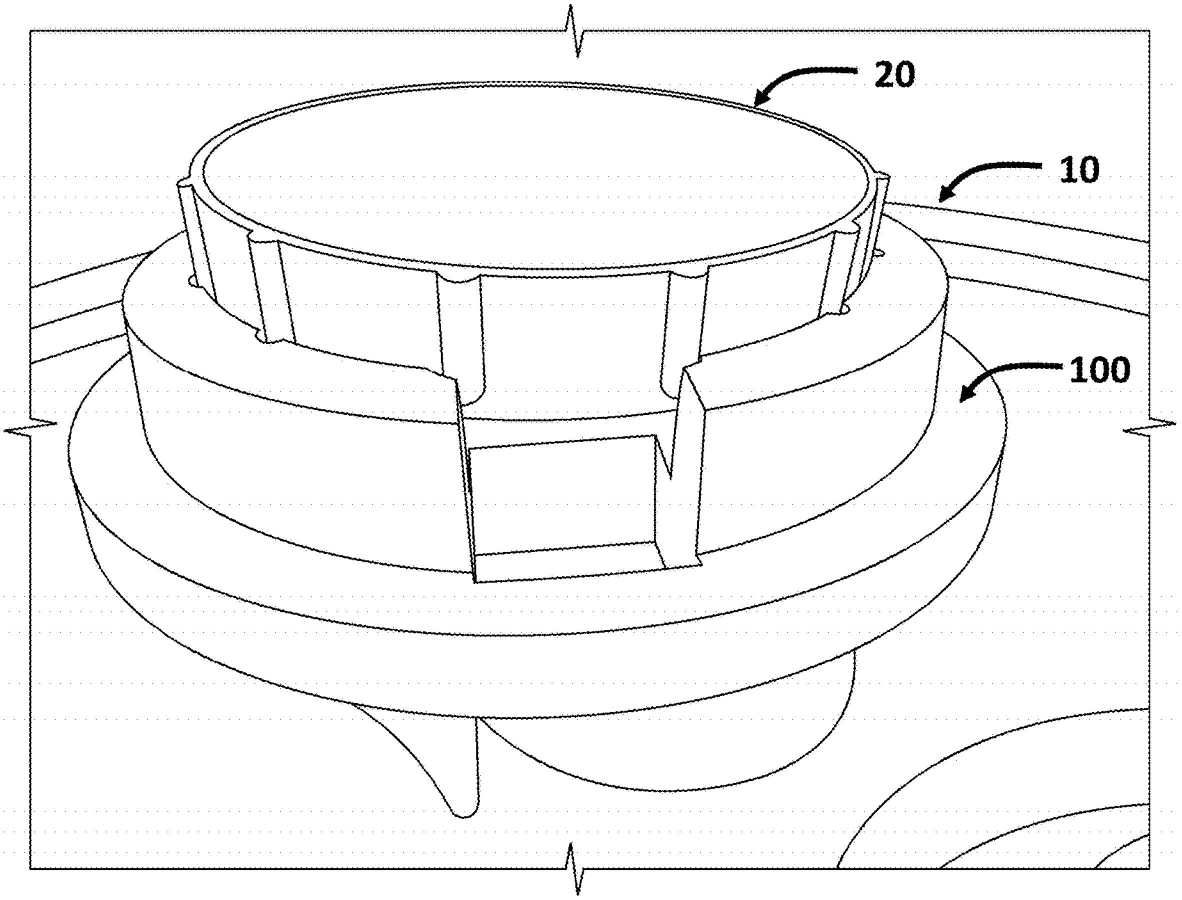
FIG. 11 is a bottom perspective view of the cap remover of FIG. 1, shown fully engaged with a removed paint cap from a 5 gallon paint can.
Figure 12:
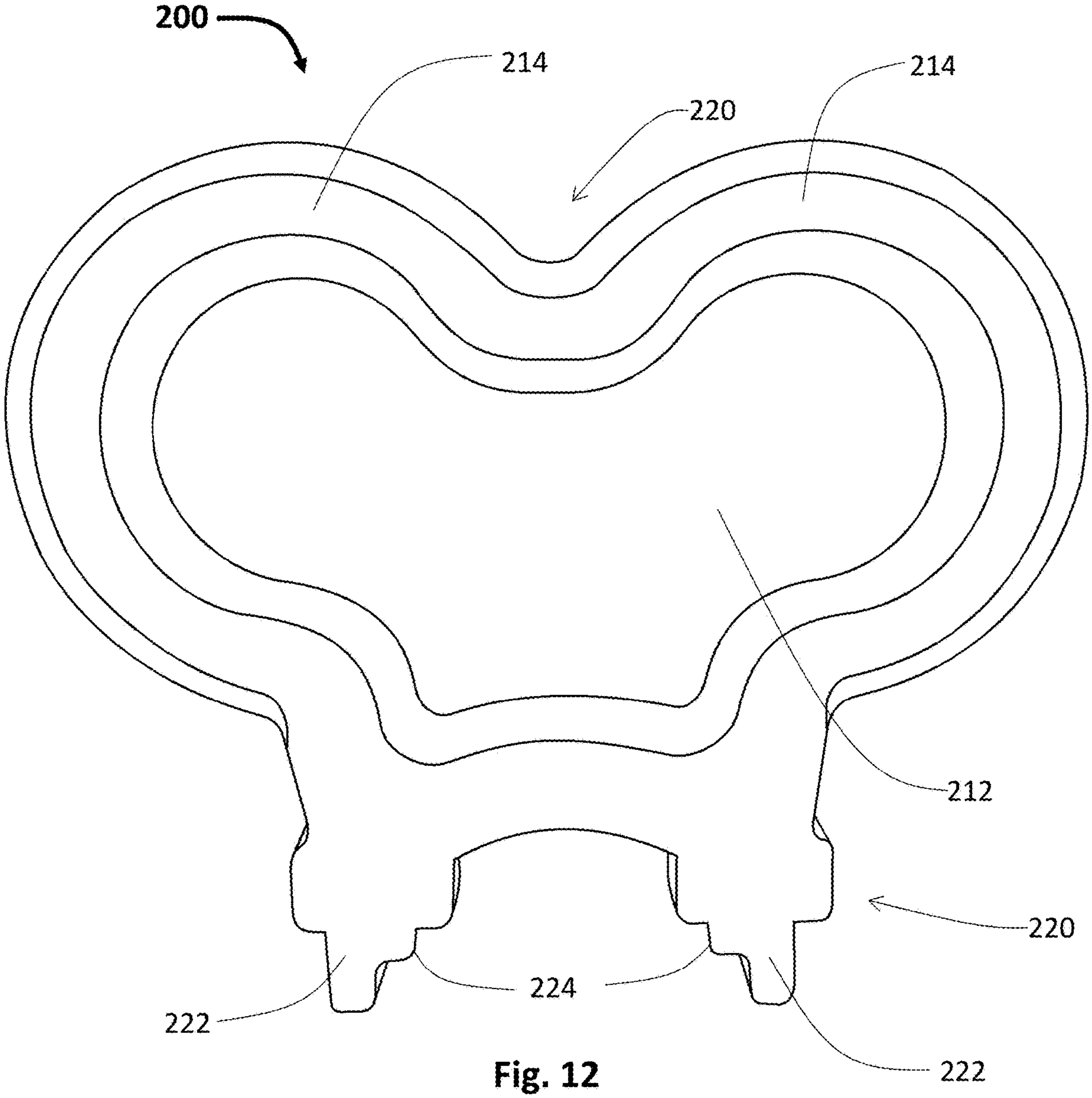
FIG. 12 is a front elevation view of a leverage element according to some embodiments of the present invention, the rear elevation view being a substantial mirror thereof
Figure 13:
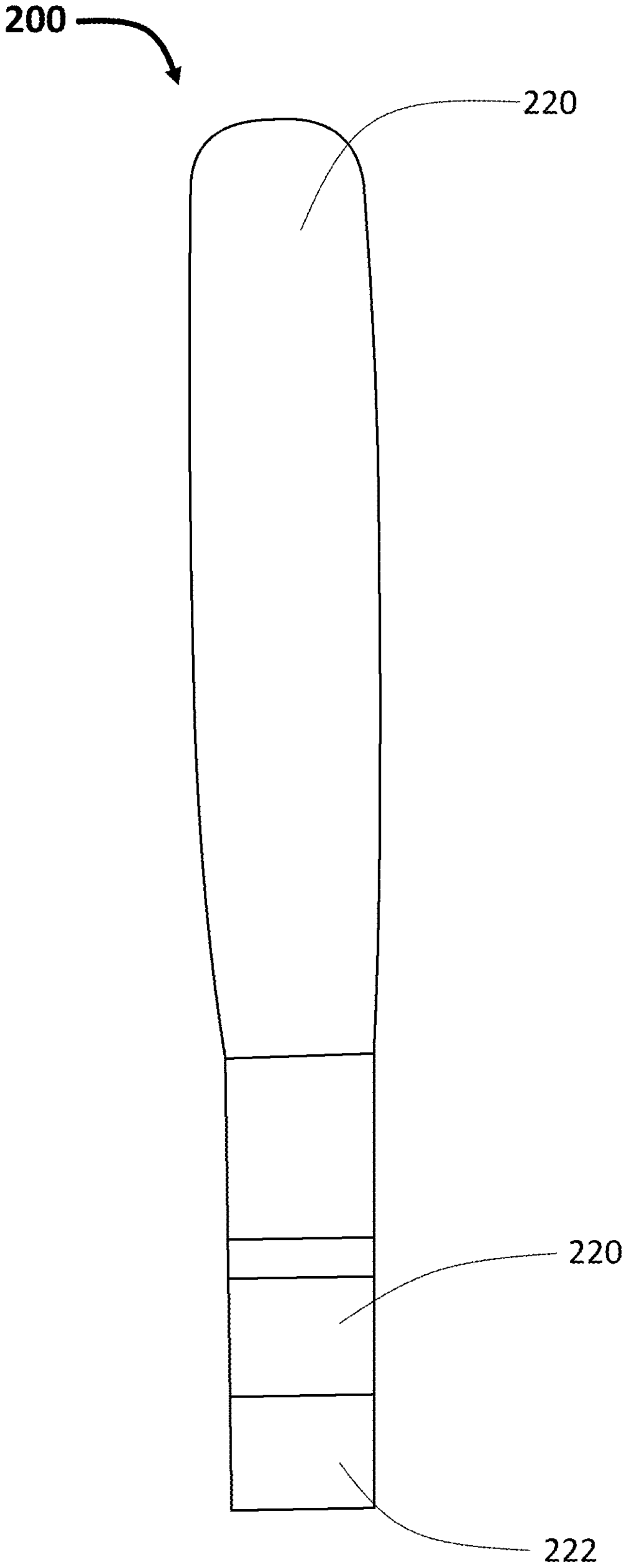
FIG. 13 is a right side elevation view of the leverage element of FIG. 12, the left side elevation view being a substantial mirror thereof.
Figure 14:
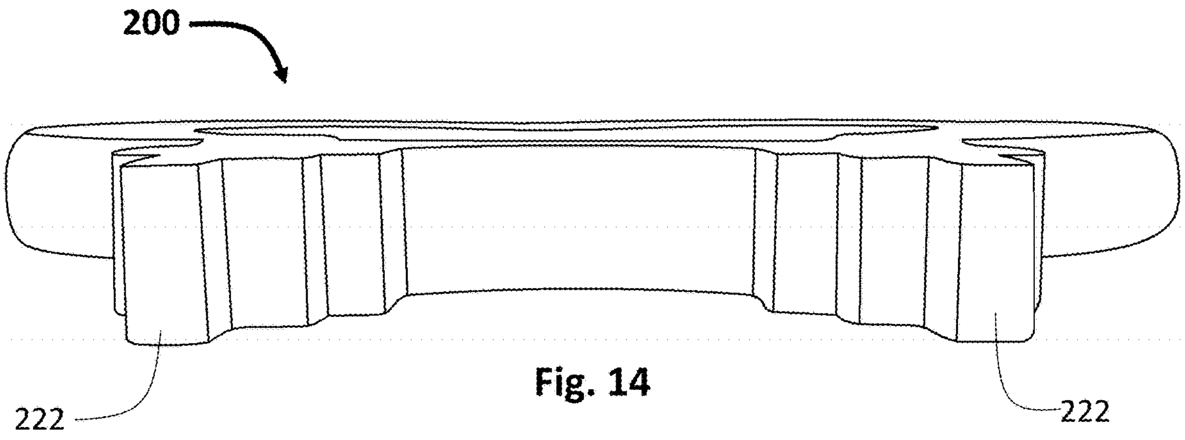
FIG. 14 is a bottom elevation view of the leverage element of FIG. 12.
Figure 15:
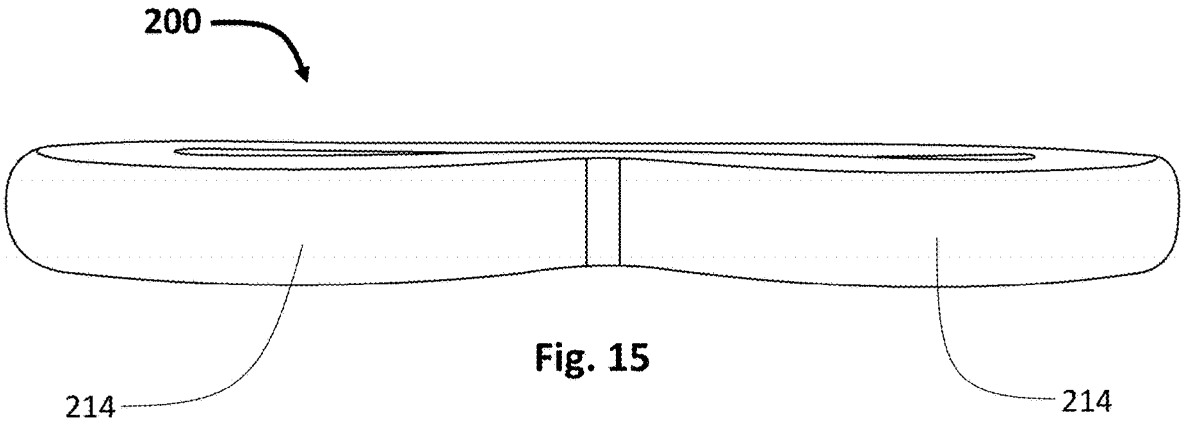
FIG. 15 is a top elevation view of the leverage element of FIG. 12.
Figure 16:
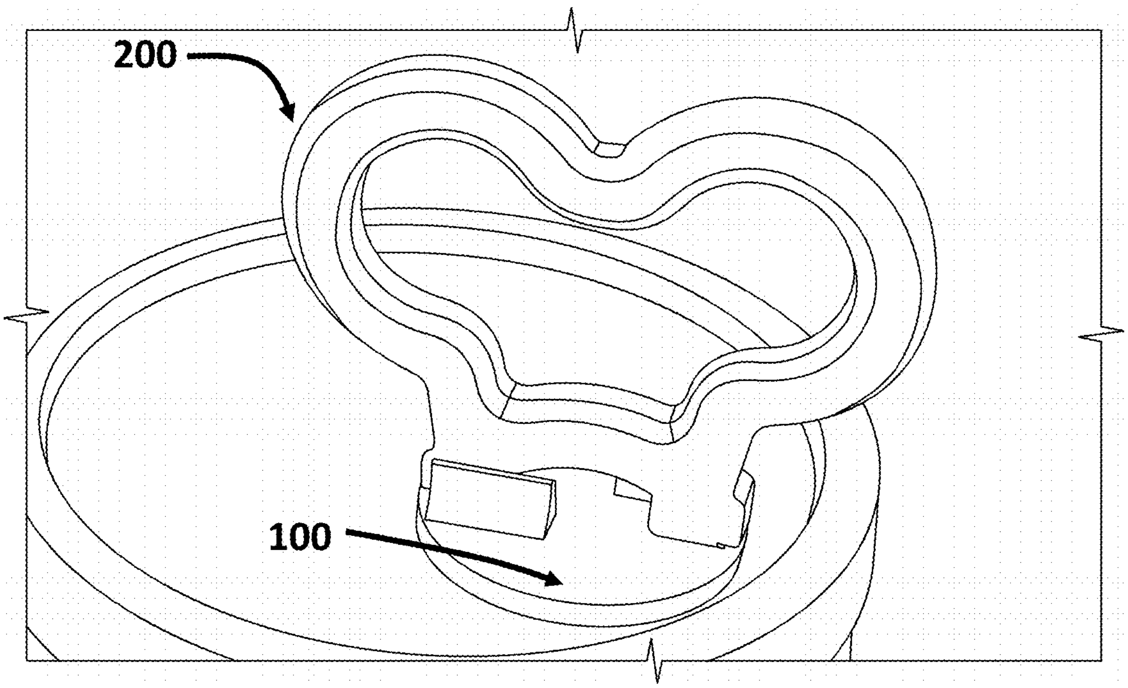
FIG. 16 is a perspective view of the leverage element and cap remover connected together and engaged with a cap located at the top of a 5 gallon paint can.
Figure 17:
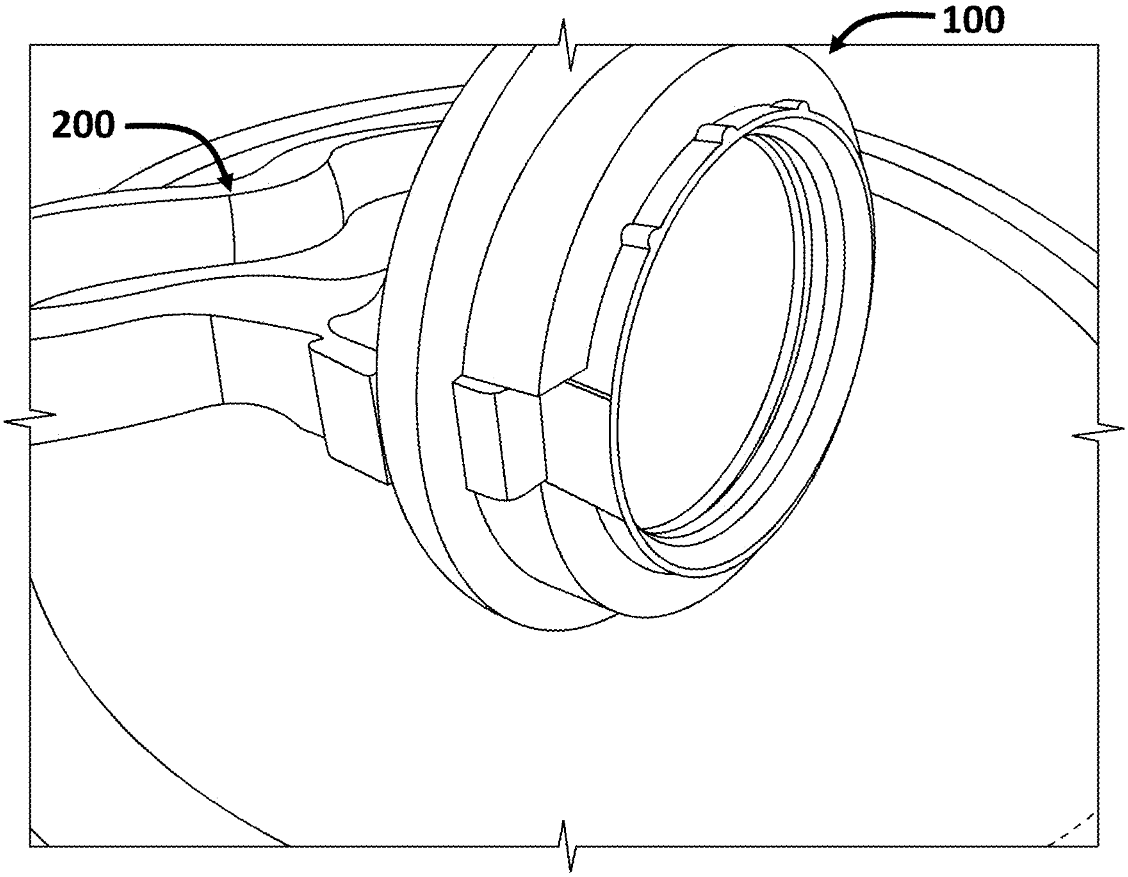
FIG. 17 is a bottom perspective view of the leverage element and cap remover of FIG. 16 with a cap located within the cap remover.
Figure 18:
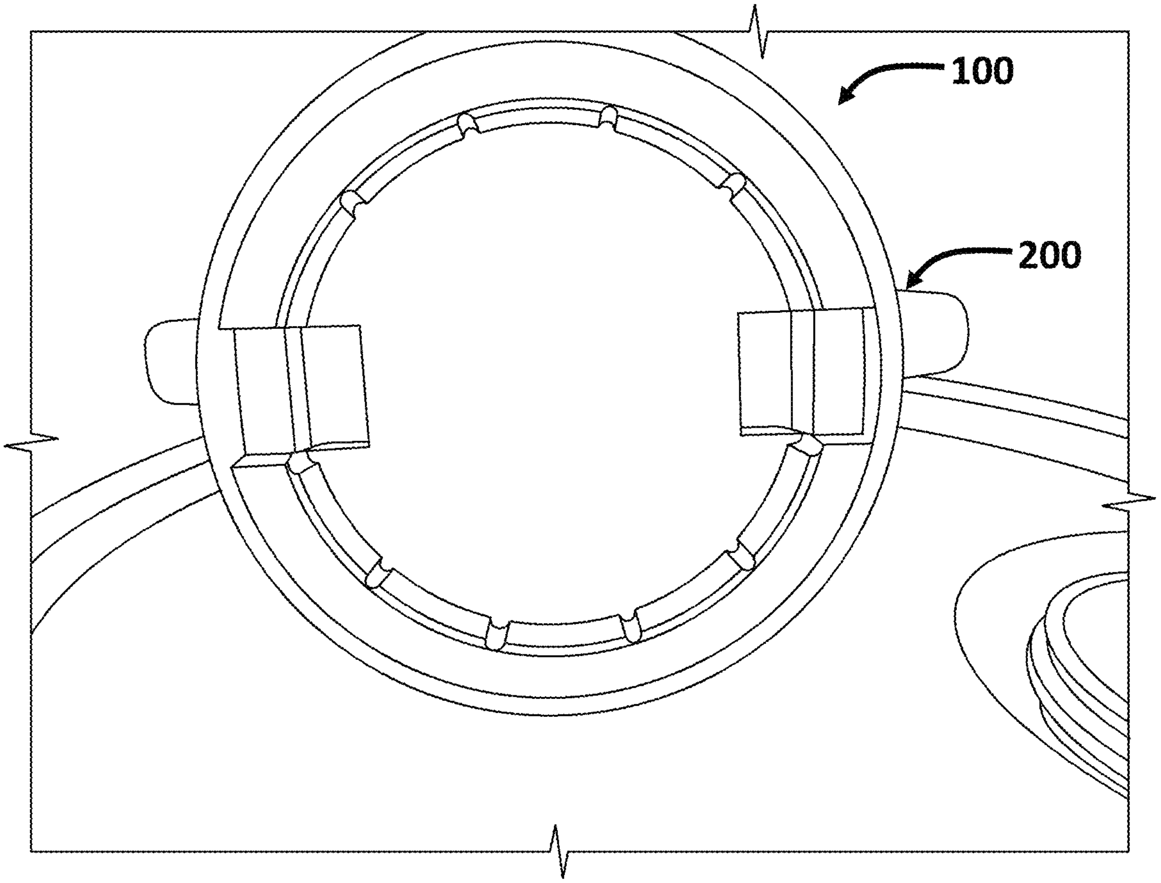
FIG. 18 is a bottom plan view of the leverage element and cap remover of FIG. 16.
Figure 19:
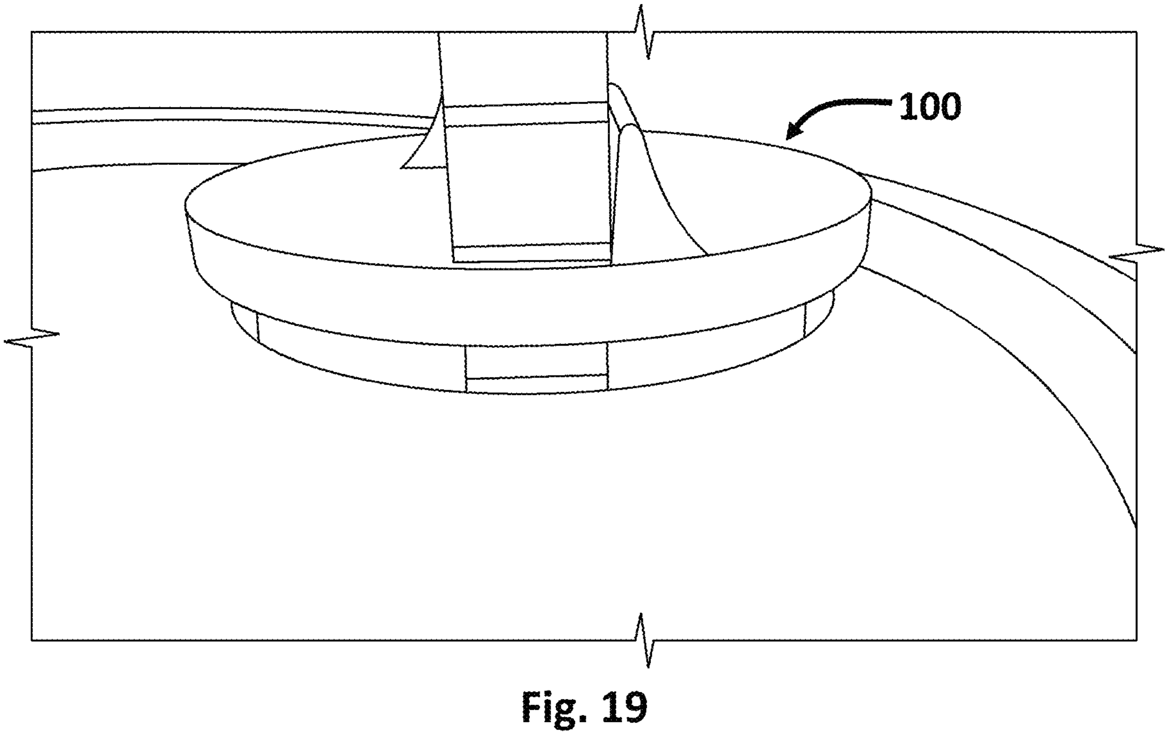
FIG. 19 is a side elevation view of the cap remover of FIG. 16, shown engaged with a paint cap, the opposing side being a mirror image thereof.
Figure 20:
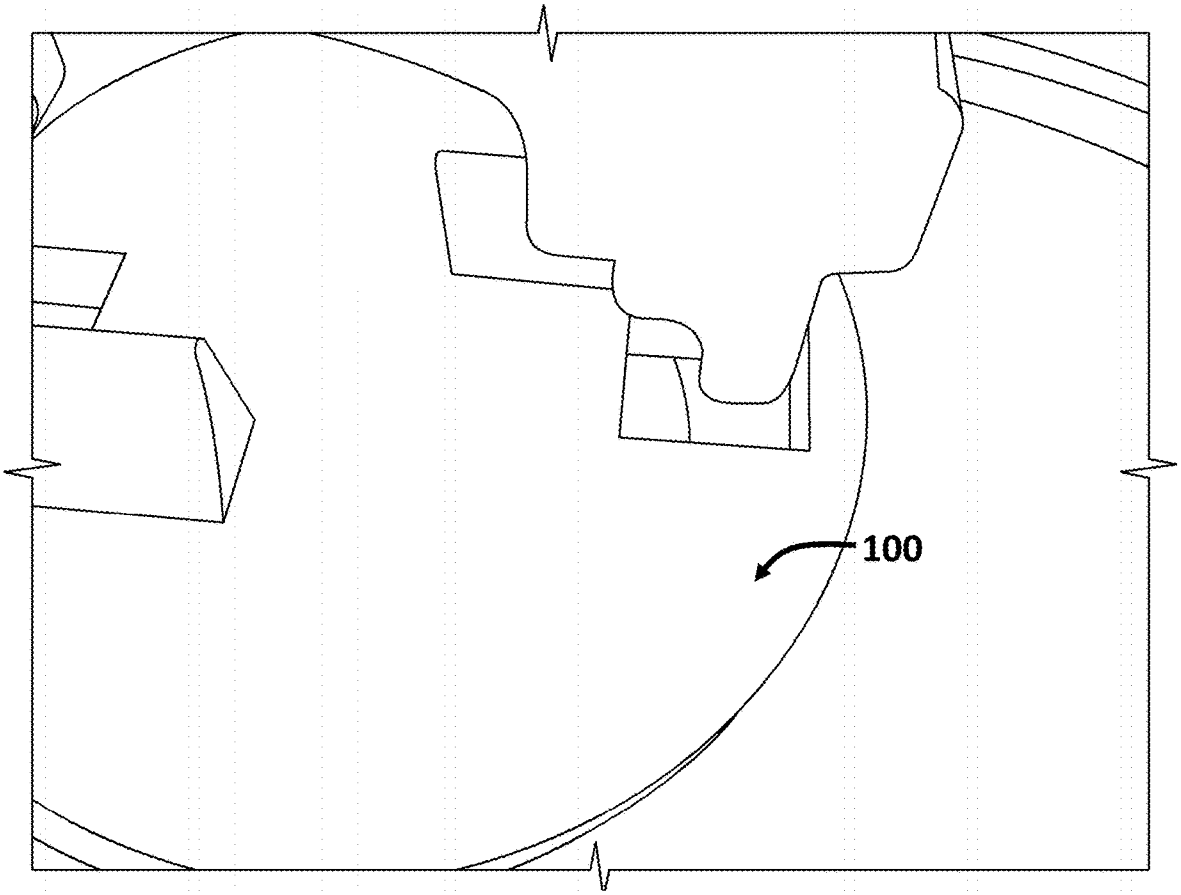
FIG. 20 is an exploded partial perspective view of the leverage element and cap remover of FIG. 16, showing how the two pieces fit together.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1-11, a cap remover 100 is provided. In some embodiments, the cap remover 100 includes a main body portion 110. In some embodiments, the main body portion 110 is generally cylindrical or circular in shape. In some embodiments, the main body portion 110 includes a top surface 112 and a bottom surface 114. In some embodiments, the main body portion 110 includes one or more holes 116, voids, or apertures. In some embodiments, the holes 116 extend from the top surface 112 to the bottom surface 114. In some embodiments, the geometry of the holes 116 at the top surface 112 is the same as the geometry of the hole 116 at the bottom surface 114, while in some embodiments the geometry differs, such that the hole 116 changes its profile or shape as it passes through the main body portion 110 from the top surface 112 to the bottom surface 114. In some embodiments, the one or more hole 116 is configured to receive or otherwise joint to one or more tab elements of connecting elements of a secondary object, such as handle or leverage element. In some embodiments, the hole 116 is defined by a plurality of interior surfaces of the main body portion 110.

In some embodiments, the cap remover 100 includes a receiving edge 120. In some embodiments, the receiving edge 120 extends from a bottom surface 114. In some embodiments, the receiving edge 120 protrudes from the bottom surface 114, such that the receiving edge 120 is positioned along an offset from the perimeter of the main body portion 110. In some embodiments, the receiving edge 120 is dimensioned so as to be capable of engaging a standard paint cap 20. In some embodiments, the receiving edge 120 is circular or arcuate in shape. In some embodiments, the receiving edge 120 extends a distance which correlates to the depth of a paint can cap 20.

In some embodiments, the receiving edge 120 includes inner 122 and outer surfaces 124. In some embodiments, the inner surface 122 includes one or more texturing feature 123, such as indents or retaining slots. In some embodiments, the texturing features 123 are configured to engage with one or more secondary object, such as a paint cap 20, to increase grip or friction against the object, or to otherwise engage the object such as to secure and manipulate the other object. In some embodiments, the texturing features 123 enable the transfer of rotational force from the cap remover 100 to the secondary object.

In some embodiments, the receiving edge 120 includes one or more interrupt 126. In some embodiments, where the perimeter or receiving edge 120 is coextensive with the hole, there is a void or interrupt 126 or otherwise a continuation of the hole or holes through the receiving edge 120, such that the receiving edge 120 is interrupted at these points. In some embodiments, the receiving edge 120 interrupt 126 includes at least one surface which is shared by at least one interior surface of the main body.

In some embodiments, the main body portion 110 includes one or more thumb tab 130. In some embodiments, the thumb tab 130 extends from the top surface 112 of the main body. In some embodiments, the thumb tabs 130 are positioned proximate at least one hole 116 associated with the main body. In some embodiments, for each hole 116 of the main body portion 110, a thumb tab 130 is positioned proximate at least one side of each of said holes 116.

In some embodiments, the thumb tab 130 includes a first surface 132 and a second surface 134. In some embodiments, the first surface 132 is configured and/or positioned such that it is facing the side of the thumb tab 130 which is proximate the hole 116. In some embodiments, where multiple thumb tabs 130 are included, the thumb tabs 130 are positioned around a central axis of the main body portion 110, such that applying a force to the first surface 132 of any thumb tab 130 generates a rotational motion around the central axis in a first direction. In some embodiments, the first direction is counter-clockwise.

In some embodiments, all thumb tabs 130 are of similar height, while in some embodiments a plurality of thumb tabs 130 differ in height. In some embodiments, a plurality of thumb tabs 130 allows for a user to place a leveraging bar against the tabs 130 to exert additional force on the cap remover 100 when opening a cap 20.

In some embodiments, the second surface 134 of the thumb tab 130 opposes the first surface 132. In some embodiments, the second surface 134 is configured such that it includes a curved profile. In some embodiments, the profile is curved from the furthest extent of the thumb tab 130 to the top surface 112, such that the thumb tab 130 is most narrow at its furthest extent and widest at its closest extent from the top surface 112. In some embodiments, the profile is configured such that the thickness of the thumb tabs 130 is consistent across their extent.

It will be appreciated that other embodiments of the cap remover 100 are made of other materials now known or hereafter developed, including: wood, metals, composites. In some embodiments, the cap remover 100 is formed from a mechanical process, such as by carving, 3d printing, molding, or the like.

Referring to FIGS. 12-15, a leverage element 200 is provided. In some embodiments, the leverage element 200 includes a handle portion 210. In some embodiments, the handle portion 210 is configured to be gripped by a user. In some embodiments, the handle portion 210 includes one or more lobe 214 configured for a user to grip. In some embodiments, the lobes 214 are generally situated along the same plane and formed from a single, consistent material. In some embodiments, the lobes 214 are separated, connected through only a connecting portion 220 of the leverage element 200, such that the lobes 214 form two separate and distinct handles for a user.

In some embodiments, the handle portion 200 includes one or more hole 212 or void protruding through a main body of the handle portion 210. In some embodiments, the one or more lobe 214 or handle is formed by the configuration of the hole 212 or void protruding through the surface. In some embodiments, the hole 212 is a hand hole and forms grips.

In some embodiments, the leverage element 200 includes a connecting portion 220 attached to the handle portion 210. In some embodiments, the leveraging element 200 has a plurality of interlocking tabs 222 extending from the connecting portion 220, wherein the plurality of interlocking tabs 222 are configured to interface with the plurality of holes 116 of the main body portion 110 of the cap remover 100.

Referring to FIGS. 16-20, in some embodiments, the cap remover 100 and the leveraging handle 200 interact as a single object. In some embodiments, the plurality of interlocking tabs 222 interact with the plurality of holes 116 of the main body portion 110 of the cap remover 100 such that the interlocking tabs 222 align with the receiving edge 120. In some embodiments, the interlocking tabs 222 form a continuous receiving edge 120 when secured within the holes 116 of the cap remover 100. In some embodiments, the cap remover 100 and the leverage element 200 are a single, unitary item. In some embodiments, the interlocking tabs 222 and the receiving edge 120 are configured in such a way as to receive a standard paint cap 20 of a paint can 10.

Figure 21:
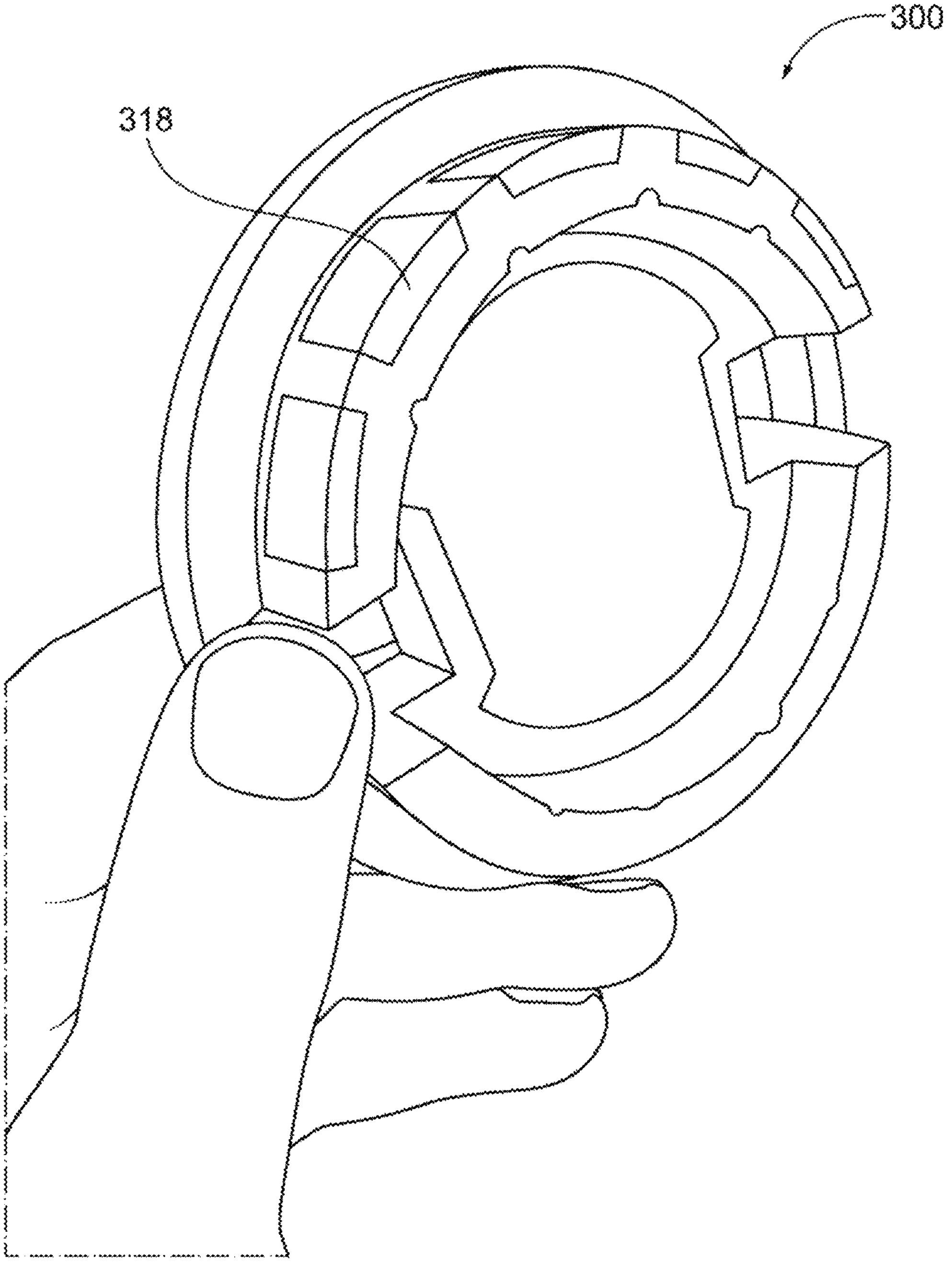
FIG. 21 is a perspective view of a cap remover according to some embodiments with lines indicating material which is marked for removal.
Figure 22:
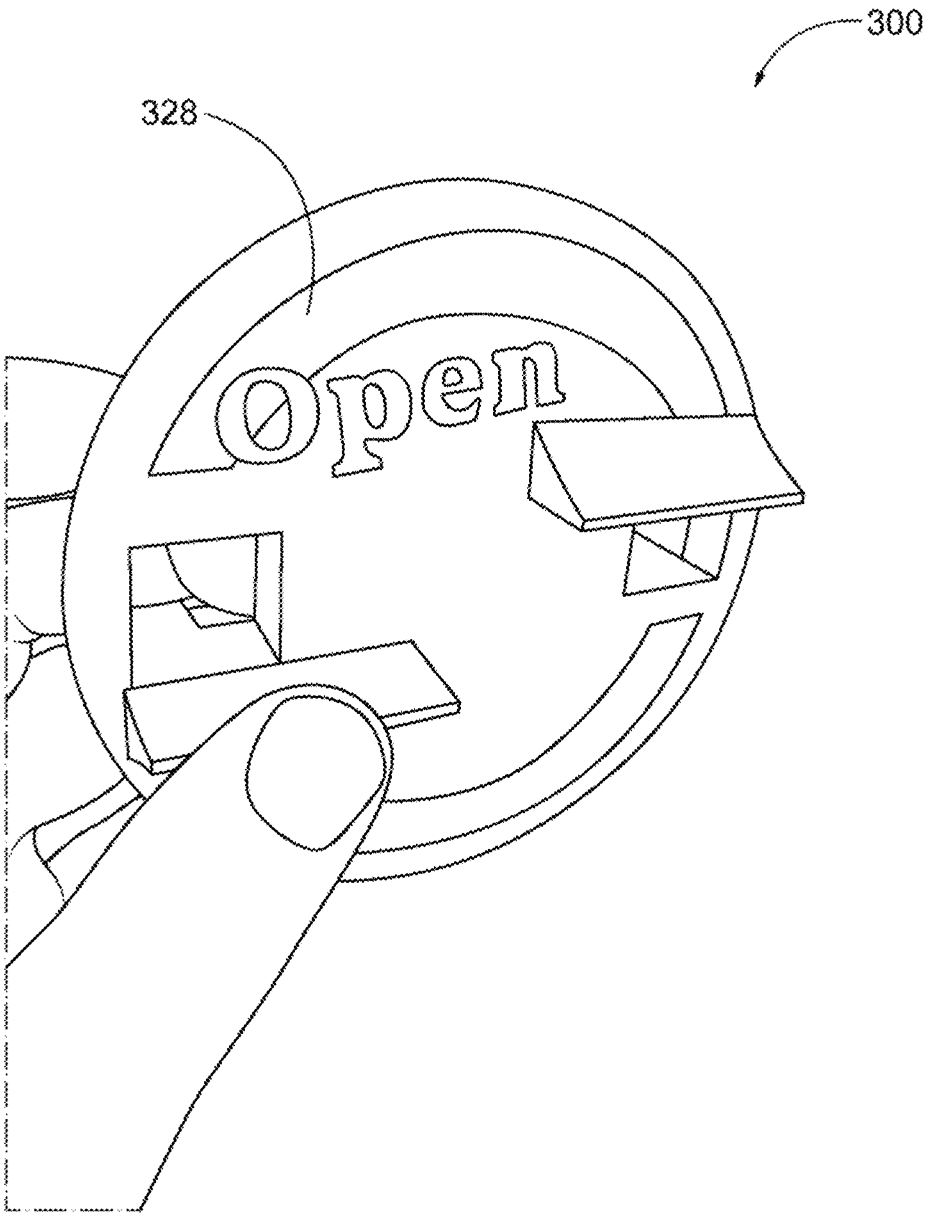
FIG. 22 is a perspective view of the cap remover of FIG. 21.

Referring to FIGS. 21 and 22, In some embodiments, the cap remover 100 has further voids or cutouts 318, 328. FIGS. 21 and 22 shows outlines of where such voids or cutouts 318, 328. would be placed. In some embodiments, the voids reduce the material usage associated with the formation of the cap remover 100 without reducing the structural integrity of the cap remover 100.

A method of removing a paint can cap is also provided. In some embodiments, the method includes utilization of the cap remover 100 described herein. In some embodiments, a cap remover 100 is placed on a paint can cap 20. In some embodiments, a handle or leverage element 220 is then engaged with the cap remover 100. In some embodiments, leverage is applied to the leverage element 220, which transfers the leverage force to the cap remover 100. In some embodiments, the leverage force is transferred at least partially via one or more thumb tab 130 of the cap remover 100. In some embodiments, leverage force is continuously applied to produce a rotational movement about a central axis of the cap 20, thereby unscrewing the cap 20.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A cap remover comprising:

a main body portion, said main body portion including opposing top and bottom surfaces;

a plurality of holes extending from said top surface to said bottom surface, said holes defined by a plurality of interior surfaces of the main body portion;

a plurality of thumb tabs extending from the top surface;

a receiving edge extending from the bottom surface, the receiving edge having an inner surface; and a leverage element, said leverage element including a handle portion and a connection portion connected to the handle portion, wherein the receiving edge is configured to engage with a cap of a paint can.

2. The cap remover of claim 1, wherein the handle portion includes opposing handles which are configured to serve as hand-grips.

3. The cap remover of claim 2, wherein the connection portion includes a plurality of tabs.

4. A cap remover comprising:

a main body portion, said main body portion include opposing top and bottom surfaces;

a plurality of holes extending through said main body portion, said holes defined by a plurality of interior surfaces of the main body portion;

a plurality of thumb tabs extending from the top surface;

a receiving edge extending from the bottom surface, the receiving edge having an inner surface, wherein the receiving edge is configured to engage with a cap of a paint can; and a leverage element, said leverage element including a handle portion and a connection portion connected to the handle portion, wherein the handle portion includes opposing handles which are configured to serve as hand-grips; and wherein the connection portion includes a plurality of tabs configured such that they each interlock with one of the plurality of holes of the main body portion of the cap remover, wherein the cap remover is in an assembled configuration when the plurality of tabs are interlocked with the plurality of holes.

5. The cap remover of claim 4, wherein the plurality of tabs are dimensioned such that each tab forms part of the receiving edge when the cap remover is in the assembled configuration.

6. The cap remover of claim 4, wherein when a force is applied to said opposing handles, the leverage element transmits said force to the cap remover main body portion, said force being transmitted at least partially through said plurality of tabs.

* * * * *